(12) United States Patent
Sugiyama et al.

(10) Patent No.: US 7,997,548 B2
(45) Date of Patent: Aug. 16, 2011

(54) VEHICLE SHIFTER MOUNTING BRACKET SYSTEM AND METHOD

(75) Inventors: Takashi Sugiyama, Dublin, OH (US); Alan Cheung, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 255 days.

(21) Appl. No.: 12/055,814

(22) Filed: Mar. 26, 2008

(65) Prior Publication Data

US 2009/0166486 A1 Jul. 2, 2009

Related U.S. Application Data

(60) Provisional application No. 61/017,903, filed on Dec. 31, 2007.

(51) Int. Cl.
*A47B 96/06* (2006.01)
(52) U.S. Cl. ............. 248/220.21; 248/174; 248/300; 248/200; 74/473.3; 74/525
(58) Field of Classification Search ............. 248/174, 248/247, 300, 301, 205.1, 220.21, 200, 220.22, 248/220.41; 74/473.3, 473.36, 473.1, 473 R, 74/525
See application file for complete search history.

(56) References Cited

U.S. PATENT DOCUMENTS

| | | | |
|---|---|---|---|
| 1,031,835 A | 7/1912 | Burnett | |
| 3,941,008 A * | 3/1976 | Cambria | 74/473.28 |
| 5,490,434 A * | 2/1996 | Osborn et al. | 74/473.1 |
| 5,497,673 A * | 3/1996 | Kataumi et al. | 74/473.3 |
| 5,768,944 A | 6/1998 | Inuzuka et al. | |
| 6,221,452 B1 | 4/2001 | Ban | |
| 6,273,466 B1 | 8/2001 | Suzuki et al. | |
| 6,286,385 B1 | 9/2001 | Nishimura et al. | |
| 6,491,322 B1 | 12/2002 | Ryner | |
| 6,526,842 B1 | 3/2003 | Tanaka et al. | |
| 6,568,295 B2 | 5/2003 | Matsuno et al. | |
| 6,869,123 B2 | 3/2005 | Marks et al. | |
| 7,469,614 B2 * | 12/2008 | Wang | 74/473.23 |
| 2004/0065496 A1 | 4/2004 | Kim | |

* cited by examiner

*Primary Examiner* — Terrell Mckinnon
*Assistant Examiner* — Todd M. Epps
(74) *Attorney, Agent, or Firm* — Kenealy Vaidya LLP; Mark E. Duell

(57) ABSTRACT

A shifter mounting bracket assembly is disclosed which can include an L-shaped flange body and an extension body extending from the L-shaped flange body. The extension body can include a first opening defined by at least one C-shaped extension portion and a second opening defined by the at least one C-shaped extension portion. The openings and C-shaped extension portions can be configured to provide a stress zone that is deformable when impact forces are applied to the shifter assembly. The extension body can have an L-shape and can be connected to the shifter assembly, while the L-shaped flange body is connected to the interior of the vehicle to hold the shifter assembly in place in the vehicle.

11 Claims, 5 Drawing Sheets

VEHICLE SHIFTER MOUNTING BRACKET SYSTEM AND METHOD

This application and invention claims the priority benefit under 35 U.S.C. §119 of U.S. Provisional Patent Application No. 61/017,903 filed on Dec. 31, 2007, which is hereby incorporated in its entirety by reference.

BACKGROUND

1. Field

The presently disclosed subject matter relates to mounting structures for vehicle transmission shifter lever components and, more particularly, to an apparatus and method that provides a deformable bracket assembly for mounting a transmission shift assembly to a vehicle frame or other structure.

2. Brief Description of the Related Art

In most vehicles, the shift lever assembly for the transmission is mounted on either the dashboard of the vehicle, steering wheel column, or on the floor of the vehicle. In any case, the shift lever is accessible to an operator of the vehicle so that he or she can adjust the transmission settings while operating the vehicle. The shifter assembly typically experiences various forces brought about by a driver's shifting of the transmission as well as those forces brought about in the event of an accident. Various mounting systems have been developed to support the shift lever assembly and couple it to the vehicle frame or other portion of the vehicle cabin. These conventional mounting systems have incorporated plates, brackets and various fasteners which firmly retain the shifter assembly to the vehicle frame or vehicle interior. Given the forces that the shifter assemblies typically encounter, conventional mounting systems have focused on providing high strength and rigidity so that the shifter assembly remains firmly connected to the vehicle frame despite the various forces which it experiences.

Instrument panels and components mounted on and in the vicinity of instrument panels should be designed to meet regulations relating to shock absorbing characteristics in an attempt to protect vehicle passengers against shocks that occur during a vehicle crash. In the case of transmission shifter assemblies mounted to vehicle dashboards, it is desirable to provide a mounting structure that provides sufficient strength and rigidity to retain the shifter assembly for operational purposes, while also providing sufficient shock absorbing and deformation characteristics in the event of a vehicle accident. Thus, it would be desirable to provide a structure for retaining a transmission shifter assembly that allows for deformation and shock absorption while is minimal in space, easy to produce, and still provides the rigidity desired for operational duties.

SUMMARY

The disclosed subject matter addresses at least some of the drawbacks in the conventional transmission shifter assembly retention systems by providing a bracket assembly that allows a shifter assembly to be mounted firmly to a vehicle's frame while also providing sufficient deformation and shock absorption characteristics. According to an aspect of the disclosed subject matter, a bracket assembly is provided which may be disposed so that the shifter assembly is mounted to the vehicle dashboard.

According to another aspect of the disclosed subject matter, a bracket assembly for mounting a shifter assembly to a vehicle frame is provided which includes an L-shaped flange and an extension body, the extension body extending from the L-shaped flange, the extension body including a first opening defined by at least one C-shaped extension portion and a second opening defined by the at least one C-shaped extension portion.

According to one aspect of the disclosed subject matter, the extension body is L-shaped.

According to another aspect of the disclosed subject matter, the L-shaped flange includes a first vertically shaped contact surface disposed along a top edge of the L-shaped flange and a second vertically shaped contact surface disposed along a bottom edge of the L-shaped flange.

According to another aspect of the disclosed subject matter, the extension body includes a first C-shaped extension portion formed along a top edge of the extension body, a second C-shaped extension portion and a third C-shaped extension portion formed along a bottom edge of the extension body.

According to another aspect of the disclosed subject matter, a first opening is formed between the first and second C-shaped extension portion and a second opening is formed between the second and third C-shaped extension portion.

According to another aspect of the disclosed subject matter, a stress zone is defined by the first and second openings and C-shaped extension portion of the extension body.

According to another aspect of the disclosed subject matter, a method for mounting a shifter assembly to a vehicle frame is provided, the method including providing an L-shaped flange capable of being fastened to the vehicle frame, providing an extension body, the extension body extending from the L-shaped flange, the extension body including a first opening defined by at least one C-shaped extension portion and a second opening defined by the at least one C-shaped extension opening, the extension body having an L-shape, and deforming the extension body along a stress zone defined by the first opening, the second opening and the at least one C-shaped extension portion.

Still other aspects, features, and attendant advantages of the disclosed subject matter will become apparent to those skilled in the art from a reading of the following detailed description of embodiments constructed in accordance therewith, taken in conjunction with the accompanying drawings.

BRIEF DESCRIPTION OF THE DRAWINGS

The disclosed subject matter will now be described in more detail with reference to exemplary embodiments of the apparatus and method, given only by way of example, and with reference to the accompanying drawings, in which.

DETAILED DESCRIPTION OF EXEMPLARY EMBODIMENTS

Figure 1:
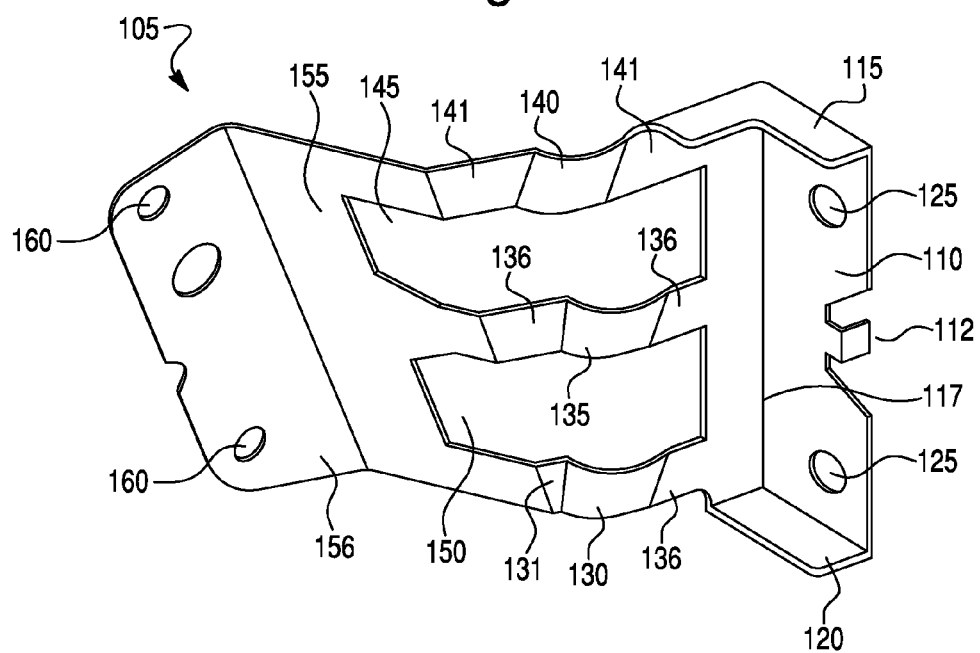
FIG. 1 illustrates a perspective view of an exemplary embodiment of a first shifter mounting bracket made in accordance with principles of the disclosed subject matter.

The disclosed subject matter provides a system and method for attaching a shifter assembly to an interior portion of a vehicle including a deformable shifter mounting bracket assembly. The system according to the disclosed embodiments may be employed in conventional shifter assemblies.

Referring to the drawing figures, like reference numerals designate identical or corresponding elements throughout the several figures.

FIG. 1 illustrates a perspective view of an exemplary embodiment of a first shifter mounting bracket according to principles of the disclosed subject matter. FIG. 1 shows a first shifter mounting bracket 105 that includes an extension body 155 extending from a flange body 110. The flange body 110 has a generally L-shaped design. As shown in FIG. 1, the flange body 110 can include fastener openings 125 and a tab 112 which are configured to allow the first shifter mounting bracket 105 to be mounted to a vehicle frame etc. and/or to reduce the material requirements of the bracket 105. The flange body 110 also includes a first contact surface 115 and second contact surface 120. The first contact surface 115 is formed as a lip on a top edge of the flange body 110 and the second contact surface 120 is formed as a lip on a bottom edge of the flange body 110. The first contact surface 115 can be formed generally perpendicular and extending away from an exterior surface 156 portion of the bracket 105 at the flange body 115, and can be formed generally parallel to the second contact surface 120. The first contact surface 115 and second contact surface 120 can also extend towards and be integrated with the extension body 155 to form an attachment between flange body 110 and extension body 155. The first and second contact surfaces 115 and 120 provide greater structural strength and rigidity to the first shifter mounting bracket 105 by bracing against shear and torsional forces that may be applied to the bracket 105 and that would otherwise be concentrated at the angled surface line 117 in the bracket 105.

FIG. 1 also depicts the first shifter mounting bracket 105 as including an extension body 155. The extension body 155 is formed so as to extend away from the flange body 110 and includes an exterior surface 156 configured to face away from the shifter assembly 320 when the bracket 105 is mounted to the shifter assembly 320. The extension body 155 includes fastener openings 160 which are utilized to mount the extension body 155 to a shifter assembly and/or to reduce the material requirements of the bracket 105. FIG. 1 also shows that the extension body 155 includes a first C-shaped extension portion 130 formed at a bottom edge of the extension body 155. A second C-shaped extension portion 135 is formed at about the center of the extension body 155, and a third C-shaped extension portion 140 is formed at a top edge of the extension body 155. A first hole or opening 150 is formed between the first C-shaped extension portion 130 and the second C-shaped extension portion 135. A second hole or opening 145 is formed between the second C-shaped extension portion 135 and the third C-shaped extension portion 140. Thus, each of the openings 145 and 150 is surrounded with a substantially planar sheet of material except for the C-shaped extension portions 130, 135, and 140 which extend in a concave fashion away from the exterior surface 156 of the bracket 105. The portions of the bracket 105 located immediately adjacent and on left and right sides of each of the C-shaped extension portions 130, 135, and 140 are substantially coplanar with each other about each respective C-shaped extension portion such that each of the C-shaped extension portions 130, 135, and 140 provides a break or crumple point for the bracket 105.

The configuration of the first, second and third C-shaped extension portions 130, 135 and 140, along with the first and second openings 145 and 150, create a stress zone which allows the entire shifter mounting bracket 105 to deform upon impact. The configuration of the shifter mounting bracket 105 also provides the entire shifter assembly and bracket system with greater lateral strength and rigidity and greater strength and rigidity in the shifting directions. It should also be noted that the extension body 155 may also have a generally L-shape in either a top view perpendicular to the exterior surface 256 as shown in the bracket 105 of FIG. 1 or a side view normal to the exterior surface 256 as in the case of the bracket 105 of FIG. 2. This shape depends on the configuration of the structures being attached by the bracket 105.

Figure 2:
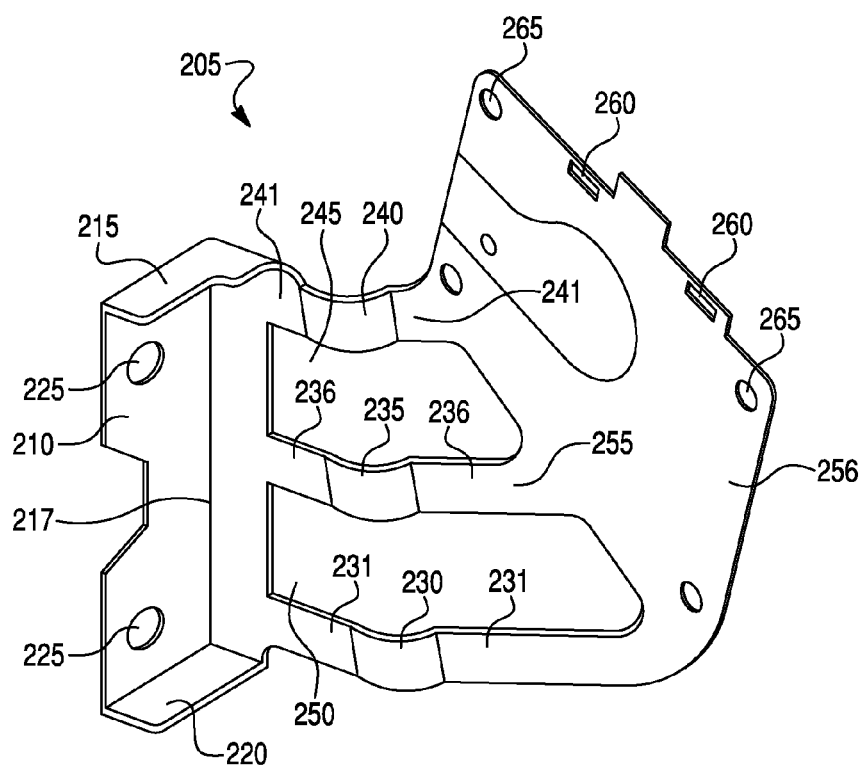
FIG. 2 illustrates a perspective view of an exemplary embodiment of a second shifter mounting bracket made in accordance with principles of the disclosed subject matter.

FIG. 2 illustrates a perspective view of an exemplary embodiment of a second shifter mounting bracket according to principles of the disclosed subject matter. FIG. 2 shows a second shifter mounting bracket 205 that includes an extension body 255 and a flange body 210. The flange body 210 has a generally L-shaped design. The flange body 210 also includes openings 225 which allow the shift mounting bracket 205 to be mounted to the body of a vehicle and/or reduces material requirements for the bracket 205. The flange body 210 also includes a first contact surface 215 and second contact surface 220. The first contact surface 215 is formed as a lip on a top edge of the flange body 210 and the second contact surface 220 is formed as a lip on a bottom edge of the flange body 210. The first and second contact surfaces 215 and 220 provide greater structural strength and rigidity to the shifter mounting bracket 205.

FIG. 2 also shows that the shifter mounting bracket 205 includes an extension body 255. The extension body 255 can be formed so as to extend away from the flange body 210. The extension body 255 includes slots 260 and fastener holes 265 which are utilized to mount the extension body 255 to a shifter assembly and/or to reduce material requirements for the bracket 205. The extension body 255 can include a first C-shaped extension portion 230 formed at a bottom edge of the extension body 255, a second C-shaped extension portion 235 formed at about the center of the extension body 255, and a third C-shaped extension portion 240 formed at a top edge of the extension body 255. A first hole or opening 250 can be formed between the first C-shaped extension portion 230 and the second C-shaped extension portion 235. A second hole or opening 245 can be formed between the second C-shaped extension portion 235 and the third C-shaped extension portion 240. Thus, each of the openings 245 and 250 is surrounded with a substantially planar sheet of material except for the C-shaped extension portions 230, 235, and 240 which extend in a concave fashion away from the exterior surface 256 of the bracket 205. The portions of the bracket 205 located immediately adjacent and on left and right sides of each of the C-shaped extension portions 230, 235, and 240 are substantially coplanar with each other about each respective C-shaped extension portion such that each of the C-shaped extension portions 130, 135, and 140 provides a break or crumple point for the bracket 105.

The configuration of the first, second and third C-shaped extension portions 230, 235 and 240 along with the first and second openings 245 and 250 create a stress zone which allows the entire shifter mounting bracket 205 to deform upon impact. The configuration of the shifter mounting bracket also provides the entire shifter assembly with greater lateral strength and rigidity and greater strength and rigidity in the shifting directions when attached to the shifter assembly.

As will be described in greater detail below, it should be understood that the first shifter mounting bracket 105 and the second shifter mounting bracket 205 may be used together to form a bracket assembly for mounting a shifter assembly to a vehicle frame or other portion of the interior of the vehicle. Although the first shifter mounting bracket 105 has some structural distinctions from the second shifter mounting bracket 205, both brackets share many common features. Most distinctions are to accommodate the layout packaging and to fit to a particular application. It should also be understood that in one embodiment, a bracket assembly for mounting a shifter assembly is configured using the first shifter mounting bracket 105 as a right mounting bracket and a second shifter mounting bracket 205 as a left mounting bracket. In other embodiments, the bracket assembly may be configured using two first shifter mounting brackets 105 or two second shifter mounting brackets 205 or other differently shaped bracket that is particular to the geometrical requirements of the vehicle and shifter assembly to be mounted.

Figure 3:
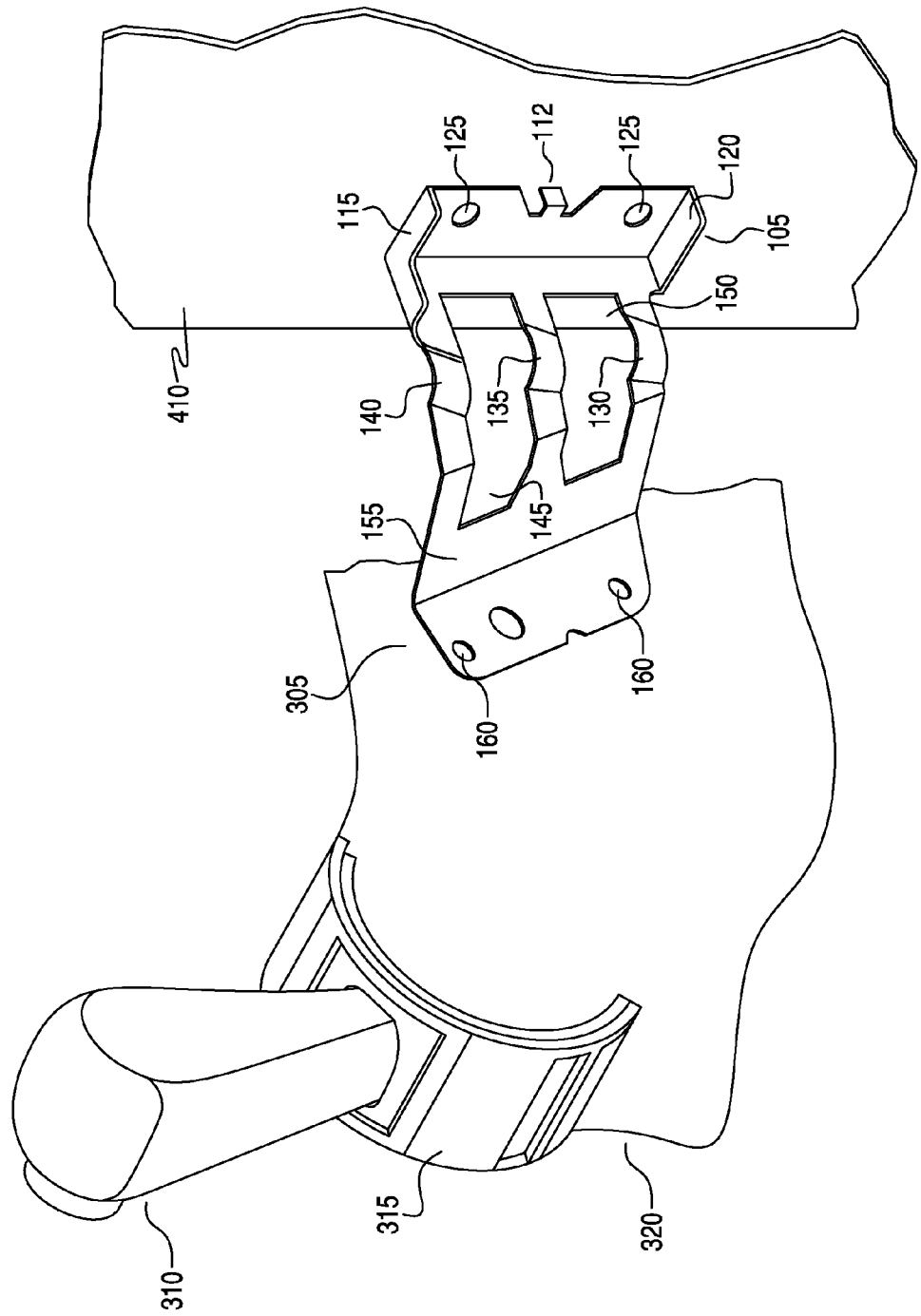
FIG. 3 shows a right side perspective view of the first shifter mounting bracket coupled to a shifter assembly in accordance with principles of the disclosed subject matter.

FIG. 3 shows the first shifter mounting bracket 105 mounted to the right side of a shifter assembly 320. The first shifter mounting bracket 105 includes an extension body 155 and a flange body 110. The flange body 110 has a generally L-shaped design. As was described above, the flange body 110 includes openings 125 and a tab 112 which allows the shift mounting bracket 105 to be mounted to the frame or interior portion of the vehicle. The flange body 110 also includes a first contact surface 115 and second contact surface 120. The first contact surface 115 is formed as a lip on a top edge of the flange body 110 and the second contact surface 120 is formed as a lip on a bottom edge of the flange body 110. The extension body 155 is formed so as to extend away from the flange body 110. The extension body 155 includes holes 160 which are utilized to mount the extension body 155 to the shifter assembly 320.

The shifter assembly 320 as shown in FIG. 3 includes a shifter 310 and a shifter body cover 315 which covers the shifter and transmission components from a vehicle occupant's view. The shifter assembly 320 also includes a mounting portion 305 that facilities mounting the shifter assembly 320 to an interior portion 410 of the vehicle, which can be the vehicle frame, escutcheon, interior moldings, etc. The bracket 105 can be mounted to the shifter assembly 320 by using fasteners that pass through the fastener holes 160. Other fastening and joining techniques can also be employed to mount the bracket 105 to the shifter assembly 320, such as welds, rivets, adhesives, clips, snap fits, etc.

Figure 4:
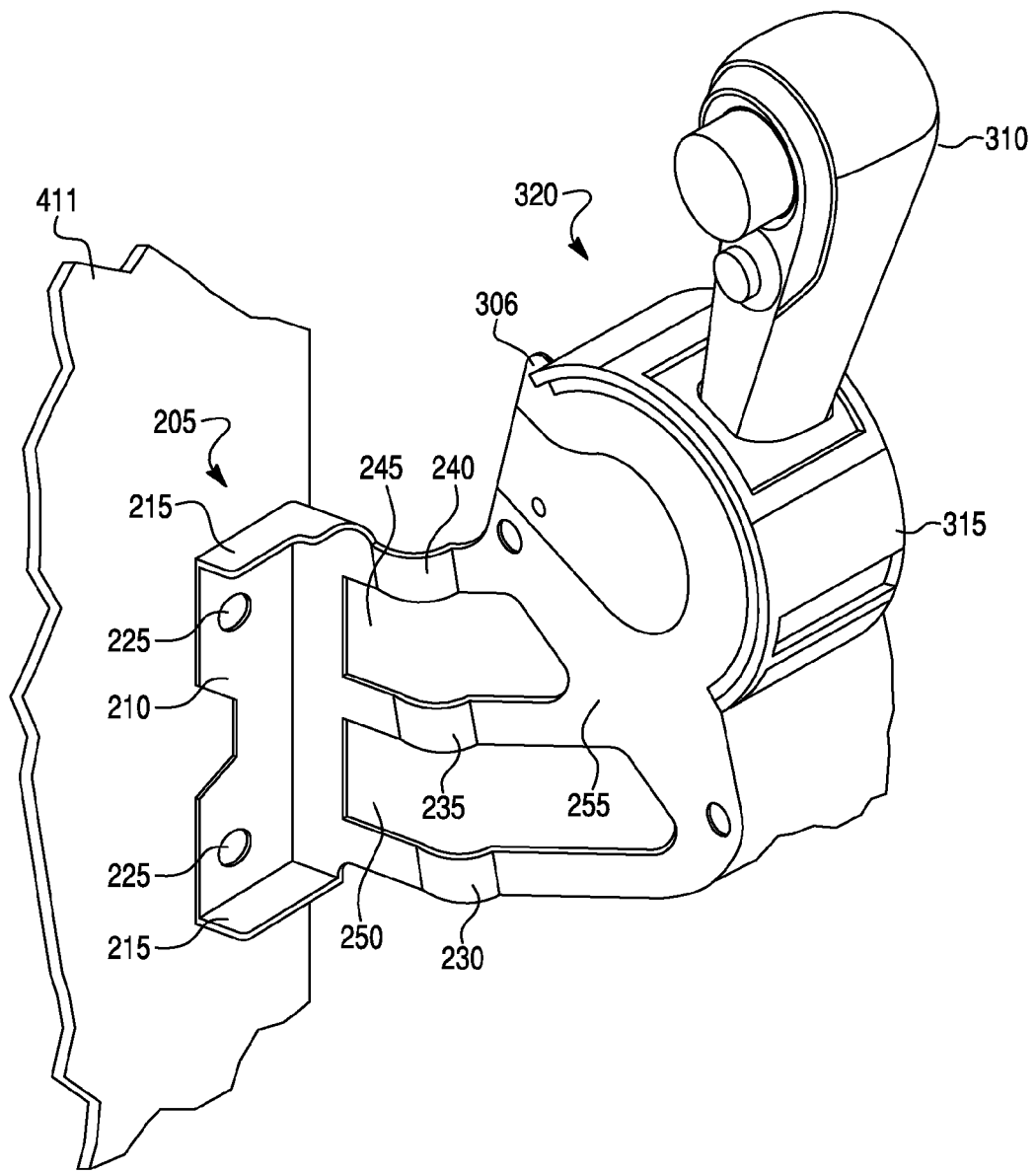
FIG. 4 shows a left side perspective view of the second shifter mounting bracket coupled to a shifter assembly in accordance with principles of the invention.

FIG. 4 shows the second shifter mounting bracket 205 mounted to the left side of the shifter assembly 320. The second shifter mounting bracket 205 includes the extension body 255 and the flange body 210. The flange body 210 has a generally L-shaped design and includes fastener openings 225 which allow the shifter mounting bracket 205 to be mounted to an interior portion 410 of the vehicle, such as a vehicle frame, escutcheon, or other surface. The flange body 210 also includes a first contact surface 215 and second contact surface 220. The first contact surface 215 is formed as a lip on a top edge of the flange body 210 and the second contact surface 220 is formed as a lip on a bottom edge of the flange body 210. The first and second contact surfaces 215 and 220 provide greater structural strength and rigidity to the system when bridged between the shifter assembly 320 and the interior portion 410 of the vehicle.

The shifter mounting bracket 205 also includes the extension body 255 which extends away from the flange body 210. The extension body 255 includes slots 260 and holes 265 which are utilized to mount the extension body to a mounting portion 306 of the shifter assembly 320.

FIG. 4 is a left side view of the shifter assembly 320 which includes the shifter 310 and the shifter body cover 315. The shifter assembly 320 includes a mounting portion 306 that facilities mounting the shifter assembly 320 to the bracket 205 and in turn to the interior portion 410 of the vehicle. The bracket 205 can be mounted to the shifter assembly 320 by using the fastener holes 265 and slots 260 in conjunction with known fasteners, such as screws, bolts, adhesives, tabs, snap fits, spring clips, etc.

Figure 5:
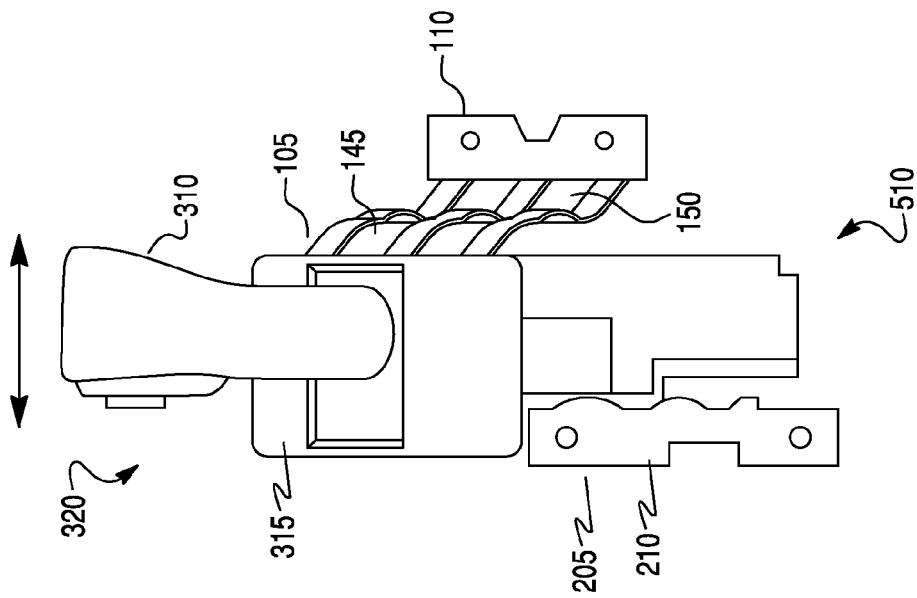
FIG. 5 is a top view of a bracket assembly coupled to a shifter assembly in accordance with principles of the disclosed subject matter.

FIG. 5 shows a top view of the shifter assembly 320 which is attached to the mounting bracket 105 at a right side and to the second shifter mounting bracket 205 at its left side. Although the first shifter mounting bracket 105 is partially obscured in the view of FIG. 5, the flange body 110 and first and second openings 150 and 145 are visible. As described earlier, the first shifter mounting bracket 105 is mounted to an interior portion 410 of the vehicle via the flange body 110. FIG. 5 also shows the second shifter mounting bracket 205 mounted to the left side of the shifter assembly 320. The second shifter mounting bracket 205 also includes the flange body 210 that is capable of mounting to the same or a different structure that makes up the interior portion 410 of the vehicle. The bracket assembly 510 that results from both the first and second brackets 105 and 205 provides greater lateral strength and rigidity in the direction of the horizontal arrow shown in FIG. 5.

Figure 6:
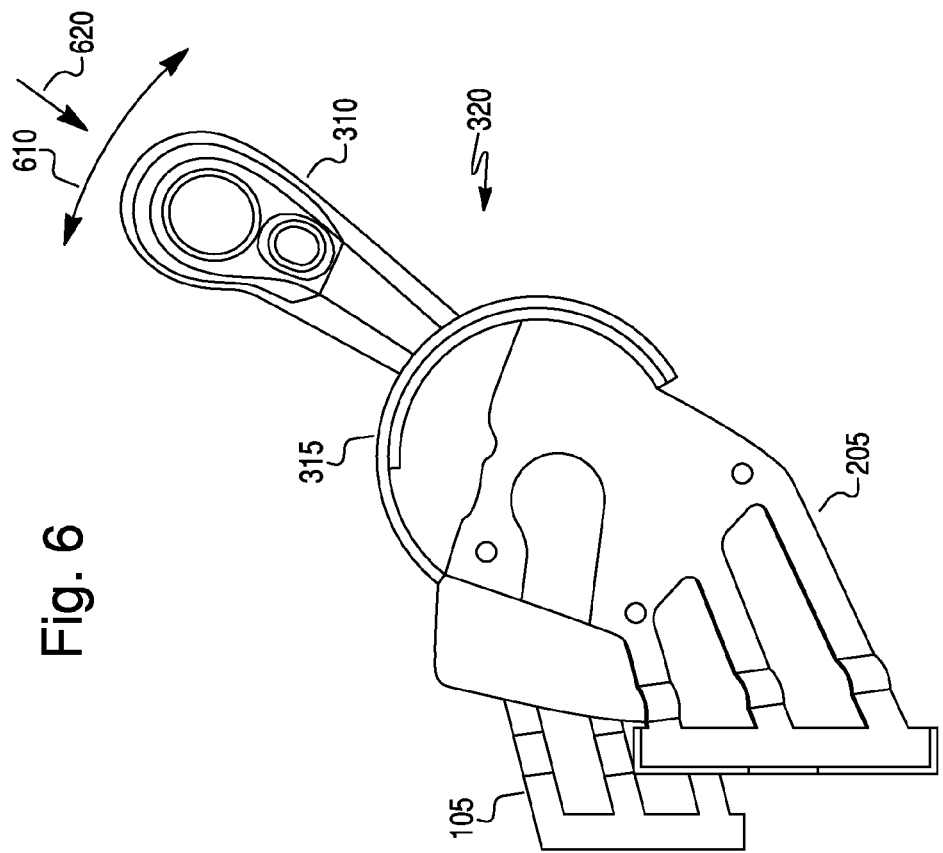
FIG. 6 is a side view of the bracket assembly and shifter assembly of FIG. 5.

FIG. 6 is a side view showing the second shifter mounting bracket 205 mounted to the shifter assembly 320. The first shifter mounting bracket 105 is also partially visible in FIG. 6. The arrow 610 shown in FIG. 6 shows the directions in which the shifter 310 may be moved when the vehicle is being operated. Movement of the shifter 310 causes various stresses on the shifter assembly which can be transferred to the bracket assembly (including brackets 105 and 205). The disclosed bracket assembly 510 can provide greater strength and rigidity than conventional mounting systems and thus can withstand greater stresses caused by movement of the shifter 310. The arrow 620 shows forces that may be applied to the shifter assembly during head impact crash testing or during an accident. The bracket assembly 510 is configured to be deformable and to absorb such impact via, among other features, the C-shaped extension portions 130, 135, 140 and 230, 235, and 240 of the brackets 105 and 205 respectively.

Figure 7:
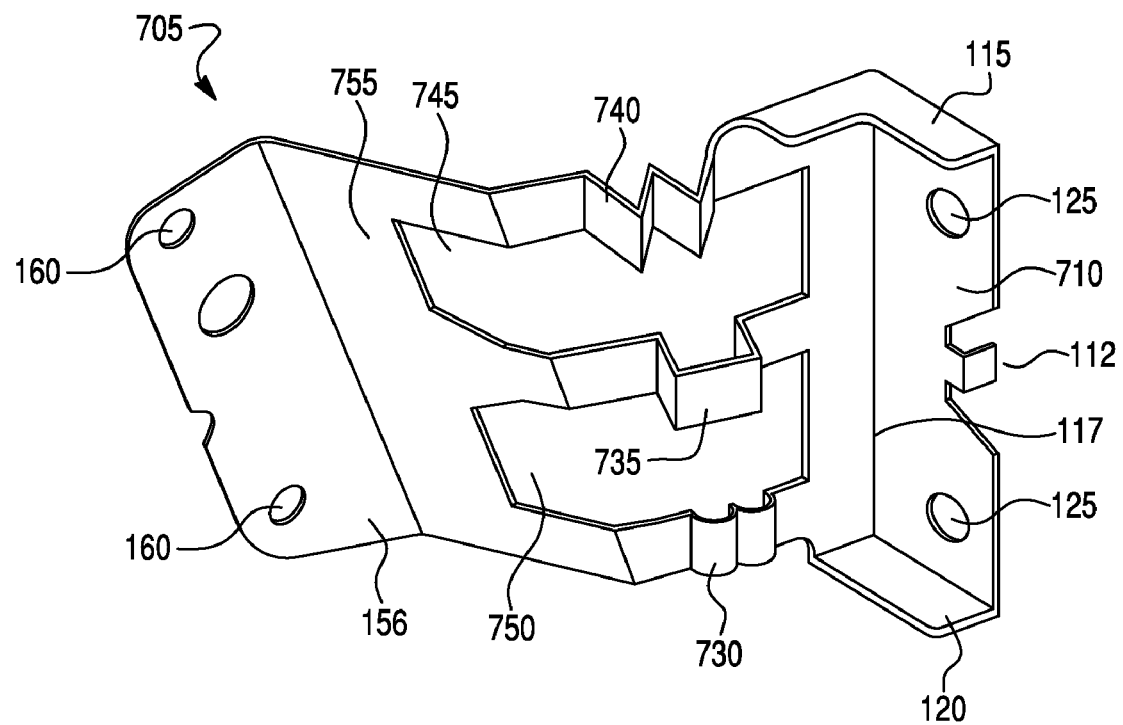
FIG. 7 illustrates a perspective view of another exemplary embodiment of a first shifter mounting bracket made in accordance with principles of the disclosed subject matter.

FIG. 7 illustrates a perspective view of another exemplary embodiment of a first shifter mounting bracket according to principles of the disclosed subject matter. The shifter mounting bracket 705 of FIG. 7 includes an extension body 755 extending from a flange body 710 and C-shaped extension portions 730, 735, and 740 defining openings 745 and 750. The bracket 705 can be substantially identical to the configuration of the shifter mounting bracket 105 shown in FIG. 1 except with respect to the C-shaped extension portions 730, 735, and 740. In this embodiment, the C-shaped extension portions 730, 735, and 740 are formed as non-symmetrical V-shaped, zigzagged, and box shaped portions, respectively.

The bracket assembly 510 according to the disclosed embodiments may be utilized whether the shifter assembly is mounted on the dashboard area of a vehicle or on the floor of the vehicle. In either case, the strength, rigidity, deformability and energy absorbing characteristics of the bracket assembly are desirable.

The bracket assembly 510 as shown includes an L-shaped bracket design to allow minimum layout packaging space. The openings and C-shaped extension portions located in the middle of the bracket create a stress zone that allow for bracket deformation during head impact crash testing and/or during a vehicle accident. The flange body portions provide a long vertical contact surface for shifting direction strength and rigidity. An L-shaped flange design can be located behind the stress zone for lateral strength and rigidity.

It should be noted that several of the disclosed structures that make up the bracket assembly can be varied in terms of shape, size, material, connections, etc., without departing from the spirit and scope of the presently disclosed subject matter. The bracket assembly can be made of any materials having good strength, rigidity and deformability. For example, the bracket assembly may be formed from sheet metal by a stamping operation performed on cold rolled steel, can be separately molded using plastic or other materials, can be cast, etc.

The C-shaped extension portions 130, 135, 140, 230, 235, and 240 are shown as arcuate shaped portions that are shaped in cross section as a letter 'C' extending outside of a plane extending between and containing the bracket adjacent portions 131, 136, 141, 231, 236, and 241 located on either side of each of the C-shaped extension portions, respectively. However, it is contemplated that substantially C-shaped extension portion include many variations in shape and configuration so long as the shape is "concave" or "convex" relative to the portions of the bracket immediately adjacent either side of the substantially C-shaped extension portion. In particular, a substantially C-shaped extension portion can include non-symmetrical extension portions, V-shaped portions, zigzagged shaped portions, partially oval portions, partially circular portions, wavy portions, box shaped portions, etc., and fall within the spirit and scope of the disclosed subject matter.

While the invention has been described in detail with reference to exemplary embodiments thereof, it will be apparent to one skilled in the art that various changes can be made, and equivalents employed, without departing from the scope of the invention. The foregoing description of embodiments of the invention has been presented for purposes of illustration and description. It is not intended to be exhaustive or to limit the invention to the precise form disclosed, and modifications and variations are possible in light of the above teachings or may be acquired from practice of the disclosed subject matter. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A bracket assembly for mounting a shifter assembly to an interior portion of a vehicle, comprising:
   a first bracket and a second bracket, each bracket having:
      a substantially L-shaped flange body; and
      an extension body extending from the substantially L-shaped flange body, the extension body including a first opening defined by at least one first substantially C-shaped extension portion and a second opening defined by at least one second substantially C-shaped extension portion, wherein the at least one first substantially C-shaped extension portion is disposed along a top edge of the extension body, the at least one second substantially C-shaped extension portion is disposed along a bottom edge of the extension body, and a third substantially C-shaped extension portion is located between the first opening and second opening and defines a portion of the first opening and second opening.

2. The bracket assembly for mounting a shifter assembly to an interior portion of a vehicle according to claim 1, wherein the L-shaped flange includes a first contact surface disposed along a top edge of the L-shaped flange and a second contact surface disposed along a bottom edge of the L-shaped flange, the first contact surface being generally parallel with the second contact surface.

3. The bracket assembly for mounting a shifter assembly to an interior portion of a vehicle according to claim 1, wherein the L-shaped flange includes at least one fastener opening for fastening the L-shaped flange to the interior portion of the vehicle, and the extension body includes at least one fastener opening for fastening the extension body to the shifter assembly.

4. The bracket assembly for mounting a shifter assembly to an interior portion of a vehicle according to claim 1, wherein the first opening is disposed between and defined by the first substantially C-shaped extension portion and the third substantially C-shaped extension portion.

5. The bracket assembly for mounting a shifter assembly to an interior portion of a vehicle according to claim 4, wherein the second opening is disposed between and defined by the second substantially C-shaped extension portion and the third substantially C-shaped extension portion.

6. The bracket assembly for mounting a shifter assembly to an interior portion of a vehicle according to claim 1, wherein two first adjacent portions are located immediately adjacent the at least one first extension portion and extend between the L-shaped flange body and a distal end of the extension body, the first extension portion extends out and away from a plane defined by and substantially containing each of the two first adjacent portions located immediately adjacent the first extension portion.

7. The bracket assembly for mounting a shifter assembly to an interior portion of a vehicle according to claim 1, wherein the first opening, second opening, first substantially C-shaped extension portion, and second substantially C-shaped extension portion define a stress zone that is configured to collapse quicker relative to a remaining portion of the bracket assembly when a force is applied to the shifter assembly and the bracket assembly is mounted to the shifter assembly.

8. The bracket assembly for mounting a shifter assembly to an interior portion of a vehicle according to claim 1, wherein the first bracket is formed as a unitary piece of stamped sheet metal and the second bracket is formed as a unitary piece of stamped sheet metal.

9. The bracket assembly for mounting a shifter assembly to an interior portion of a vehicle according to claim 1, wherein the first and second substantially C-shaped extension portions are one of C-shaped, non-symmetrical shaped, zigzag shaped, and box shaped.

10. A method for mounting and testing a shifter assembly using the bracket assembly of claim 1, comprising:
    providing the L-shaped flange configured to be fastened to an interior portion of the vehicle;
    providing the extension body, the extension body extending from the L-shaped flange, the extension body including the first opening defined by at least one first C-shaped extension portion and the second opening defined by at least one second C-shaped extension portion, the extension body having connection structure located at a distal end of the extension body away from the L-shaped flange; and
    deforming the extension body along a stress zone defined by the first opening, the second opening, the at least one first C-shaped extension portion, and the at least one second C-shaped extension portion upon the application of a force to the shifter assembly.

11. The method for mounting and testing a shifter assembly for a vehicle of claim 10, wherein deforming includes deforming the stress zone prior to deforming all other portions of the L-shaped flange and extension body.

* * * * *